United States Patent
Okumura et al.

(10) Patent No.: US 10,337,174 B2
(45) Date of Patent: Jul. 2, 2019

(54) WORKING MACHINE DISPLAY SYSTEM, WORKING MACHINE DISPLAY DEVICE, AND WORKING MACHINE DISPLAY FOR PROMPT SCREEN TRANSITION EVEN WHEN ABNORMAL PROCESSING OCCURS

(71) Applicant: Komatsu Ltd., Tokyo (JP)

(72) Inventors: Yosuke Okumura, Hiratsuka (JP); Takehiro Shibata, Naka-gun (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/111,267

(22) PCT Filed: Jul. 31, 2015

(86) PCT No.: PCT/JP2015/071885
§ 371 (c)(1),
(2) Date: Jul. 13, 2016

(87) PCT Pub. No.: WO2016/013686
PCT Pub. Date: Jan. 28, 2016

(65) Prior Publication Data
US 2017/0030054 A1    Feb. 2, 2017

(51) Int. Cl.
*E02F 9/26* (2006.01)
*H04N 5/247* (2006.01)
(Continued)

(52) U.S. Cl.
CPC ............. *E02F 9/26* (2013.01); *E02F 9/261* (2013.01); *H04N 5/23293* (2013.01);
(Continued)

(58) Field of Classification Search
CPC ....... B60K 35/00; B60R 1/00; B60R 2300/20; E02F 3/32; E02F 9/26; E02F 9/261;
(Continued)

(56) References Cited

U.S. PATENT DOCUMENTS 3,008,024 A * 11/1961 Roeser ................. H01H 23/162
200/332
2005/0151845 A1   7/2005 Tsukada et al.
(Continued)

FOREIGN PATENT DOCUMENTS

CN      103080990 A    5/2013
CN      103154391 A    6/2013
(Continued)

OTHER PUBLICATIONS

International Search Report dated Oct. 27, 2015, issued for PCT/JP2015/071885.
(Continued)

*Primary Examiner* — Francis Geroleo
(74) *Attorney, Agent, or Firm* — Locke Lord LLP

(57) ABSTRACT

A working machine display system includes: a monitor including a display unit; a first monitor control unit connected to the monitor and configured to generate a screen for displaying various kinds of information of a working machine and output the screen as a signal to the monitor; a second monitor control unit connected to the monitor and configured to generate a screen for displaying special information of the working machine and output the screen as a signal to the monitor; and a return switch. The monitor displays the various kinds of information in accordance with a signal output from the first monitor control unit and displays the special information in accordance with a signal output from the second monitor control unit, and the return switch causes a transition from a display screen of the special information to a display screen of the various kinds of information.

9 Claims, 9 Drawing Sheets

(51) Int. Cl.
  *H04N 5/232* (2006.01)
  *H04N 7/18* (2006.01)
  *B60R 1/00* (2006.01)
  *E02F 3/32* (2006.01)

(52) U.S. Cl.
  CPC .............. *H04N 5/247* (2013.01); *H04N 7/18* (2013.01); *H04N 7/181* (2013.01); *B60R 1/00* (2013.01); *B60R 2300/20* (2013.01); *E02F 3/32* (2013.01)

(58) Field of Classification Search
  CPC ...... H04N 5/23293; H04N 5/247; H04N 7/18; H04N 7/181
  USPC .......................................................... 348/86
  See application file for complete search history.

(56) References Cited

U.S. PATENT DOCUMENTS

| | | | |
|---|---|---|---|
| 2007/0164873 A1 | 7/2007 | Yamada et al. | |
| 2013/0147958 A1* | 6/2013 | Mitsuta | B60R 1/00 348/148 |
| 2013/0169690 A1* | 7/2013 | Gotou | B60R 1/00 345/660 |
| 2013/0176120 A1* | 7/2013 | Shibamori | E02F 9/267 340/438 |

FOREIGN PATENT DOCUMENTS

| | | | |
|---|---|---|---|
| DE | 112004002542 B4 | | 6/2011 |
| JP | 2004346643 A | * | 12/2004 |
| JP | 2008-148059 A | | 6/2008 |
| JP | 2011-065301 A | | 3/2011 |
| JP | 2013-253402 A | | 12/2013 |
| JP | 2014-125865 A | | 7/2014 |
| JP | 2014-225819 A | | 12/2014 |
| JP | 2015-075426 A | | 4/2015 |
| KR | 10-2013-0124304 A | | 11/2013 |
| WO | 2012/169352 A1 | | 12/2012 |

OTHER PUBLICATIONS

First Office Action dated Jun. 5, 2017, in the corresponding Chinese patent application No. 201580004204.5 and English machine translation thereof.

* cited by examiner

… (1)

WORKING MACHINE DISPLAY SYSTEM, WORKING MACHINE DISPLAY DEVICE, AND WORKING MACHINE DISPLAY FOR PROMPT SCREEN TRANSITION EVEN WHEN ABNORMAL PROCESSING OCCURS

FIELD

The present invention relates to a working machine display system, a working machine display device, and a working machine display method capable of causing, with a simple configuration, a prompt transition to a screen generated by a control unit that is different from a control unit that generates an image for performing various kinds of adjustment processing even when abnormal processing occurs in the control unit that generates the adjustment processing image and adjustment input cannot be performed.

BACKGROUND

In the field of working machines such as an excavator, a plurality of cameras are placed on the rear side and the lateral side of a vehicle body, and an image captured by each of the cameras is shown as a single camera image on a monitor in a cab of the working machine so that an operator can visually recognize an obstacle present around the vehicle body. Further, as disclosed in Patent Literature 1, images captured by the respective cameras are transformed into upper viewpoint images, the transformed images are synthesized to generate a bird's eye image, and the bird's eye image is displayed on a monitor so as to simultaneously monitor the surroundings of a vehicle body.

Further, there is a display device such as a monitor that has a function for performing calibration (adjustment processing) on an image to be displayed. For example, Patent Literature 2 is a document regarding calibration in a touch panel and describes one capable of performing a calibration mode by detecting the turning-on of power to an electronic device provided with a touch panel or touch to the touch penal by a predetermined number of times within a certain time from a reset operation even when an incorrect reference point is set, or when a resistance value of the touch penal largely changes to cause large displacement between the position of a display screen and a touch panel input position and touch of an operation button cannot be detected.

CITATION LIST

Patent Literature

Patent Literature 1: Unexamined Japanese Patent Application Publication No. 2013-253402
Patent Literature 2: Unexamined Japanese Patent Application Publication No. 2011-65301

SUMMARY

Technical Problem

Image processing such as the generation of a bird's eye image is an operation with a large load. Thus, typically, the processing performed by a monitor control unit for displaying machine gauge information (for example, engine water temperature and fuel remaining amount) on a display unit such as a monitor involves difficulties. Therefore, an image processing controller (a periphery monitoring control unit) that is separated from the monitor and provided with a general-purpose image processing accelerator performs the processing.

In order to generate a correct upper viewpoint image (bird's eye image), it is necessary to previously input installation positions and directions of a plurality of cameras installed in a working machine to the image processing controller and perform various kinds of calibration while checking whether an image displayed on a display unit is a correct upper viewpoint image. A dedicated screen for performing calibration (adjustment processing screen) is prepared, and various kinds of calibration are performed with a current bird's eye image displayed on the dedicated screen. Thus, the adjustment processing screen for performing calibration is required to be generated on the image processing controller.

However, when any malfunction occurs in the image processing controller during a calibration operation, input may not be received with the adjustment processing screen remaining displayed. In this case, an operator tries to cause a transition from the adjustment processing screen to a standard screen on which the fuel remaining amount and the engine water temperature are displayed as a temporary measure. However, when the adjustment processing screen itself does not receive the input, it is not possible to cause a transition to the standard screen. Thus, when a malfunction occurs in the image processing controller, not only a bird's eye image may not be generated, but also the working machine may not be operated.

The present invention has been made in view of the above circumstances, and an object thereof is to provide a working machine display system, a working machine display device, and a working machine display method capable of causing, with a simple configuration, a prompt transition to a screen generated by a monitor even when abnormal processing of a periphery monitoring control unit occurs and an adjustment operation cannot be performed in the generation of an adjustment processing screen for performing calibration by the periphery monitoring control unit.

Solution to Problem

To solve the problem and achieve the object, a working machine display system according to the present invention includes: a monitor including a display unit; a first monitor control unit connected to the monitor and configured to generate a screen for displaying various kinds of information of a working machine and output the screen as a signal to the monitor; a second monitor control unit connected to the monitor and configured to generate a screen for displaying special information of the working machine and output the screen as a signal to the monitor; and a return switch, the monitor is configured to display the various kinds of information of the working machine on the display unit in accordance with a signal output from the first monitor control unit and display the special information of the working machine on the display unit in accordance with a signal output from the second monitor control unit, and the return switch is a switch configured to cause a transition from a display screen of the special information of the working machine displayed on the display unit to a display screen of the various kinds of information of the working machine.

Moreover, the above-described working machine display system according to the present invention further includes a plurality of cameras configured to acquire conditions around the working machine, the second monitor control unit is a periphery monitoring control unit connected to the cameras and configured to generate a single camera image of each of the cameras, a bird's eye image generated based on images captured by the cameras, and an adjustment processing screen for performing adjustment processing for the bird's eye image, the special information of the working machine includes the adjustment processing screen, the periphery monitoring control unit is configured to generate the adjustment processing screen and output the adjustment processing screen as a signal to the monitor, and the return switch is a switch configured to cause a transition from a state in which the display unit of the monitor displays the adjustment processing screen to the display screen of the various kinds of information of the working machine.

Moreover, in the above-described working machine display system according to the present invention, the return switch is displayed on the monitor or disposed on the monitor.

Moreover, in the above-described working machine display system according to the present invention, the return switch is separated from the monitor.

Moreover, in the above-described working machine display system according to the present invention, the adjustment processing screen includes the bird's eye image and/or the single camera image.

Moreover, in the above-described working machine display system according to the present invention, the various kinds of information of the working machine includes machine information, warning information, a menu screen and/or a maintenance screen.

Moreover, in the above-described working machine display system according to the present invention, the special information of the working machine includes a single camera image, a bird's eye image, an adjustment processing screen, information about an obstacle around the working machine, landform information of the entire working site, landform information around the working machine for supporting and guiding operation of the working machine and/or image information around the working machine used for remote control.

Moreover, a working machine display device according to the present invention includes: a monitor including a display unit; a first monitor control unit connected to the monitor and configured to generate a screen for displaying various kinds of information of a working machine and output the screen as a signal to the monitor; a second monitor control unit connected to the monitor and configured to generate a screen for displaying special information of the working machine and output the screen as a signal to the monitor; and a return switch, the monitor is configured to display the various kinds of information of the working machine on the display unit in accordance with a signal output from the first monitor control unit and display the special information of the working machine on the display unit in accordance with a signal output from the second monitor control unit, and the return switch is a switch configured to cause a transition from a display screen of the special information of the working machine displayed on the display unit to a display screen of the various kinds of information of the working machine.

Moreover, a display method according to the present invention in a working machine including a monitor having a display unit, and a return switch includes: a first monitoring step of generating a screen for displaying various kinds of information of the working machine and outputting the screen as a signal to the monitor; a second monitoring step of generating a screen for displaying special information of the working machine and outputting the screen as a signal to the monitor; a first displaying step of displaying the various kinds of information of the working machine on the display unit in accordance with a signal output in the first monitoring step; and a second displaying step of displaying the special information of the working machine on the display unit in accordance with a signal output in the second monitoring step, and the various kinds of information of the working machine is displayed on the display unit by the first displaying step in response to an operation of the return switch from a display screen with the special information of the working machine displayed on the display unit by the second displaying step.

In the present invention, there is provided the return switch for causing a transition from the display screen of special information of the working machine generated by the second monitor control unit to the screen generated by the first monitor control unit. Thus, even when any malfunction occurs in the second monitor control unit which generates the display screen of special information of the working machine, for example, the adjustment processing screen for performing calibration, for example, the periphery monitoring control unit, and adjustment processing cannot be performed, it is possible to cause a prompt transition to the screen generated by the monitor, for example, the standard screen with a simple configuration. Accordingly, it is possible to reliably check basic information such as engine water temperature and fuel remaining amount.

DESCRIPTION OF EMBODIMENT

Hereinbelow, an embodiment of the present invention will be descried with reference to the accompanying drawings.

[Entire Configuration of Excavator]

Figure 1:
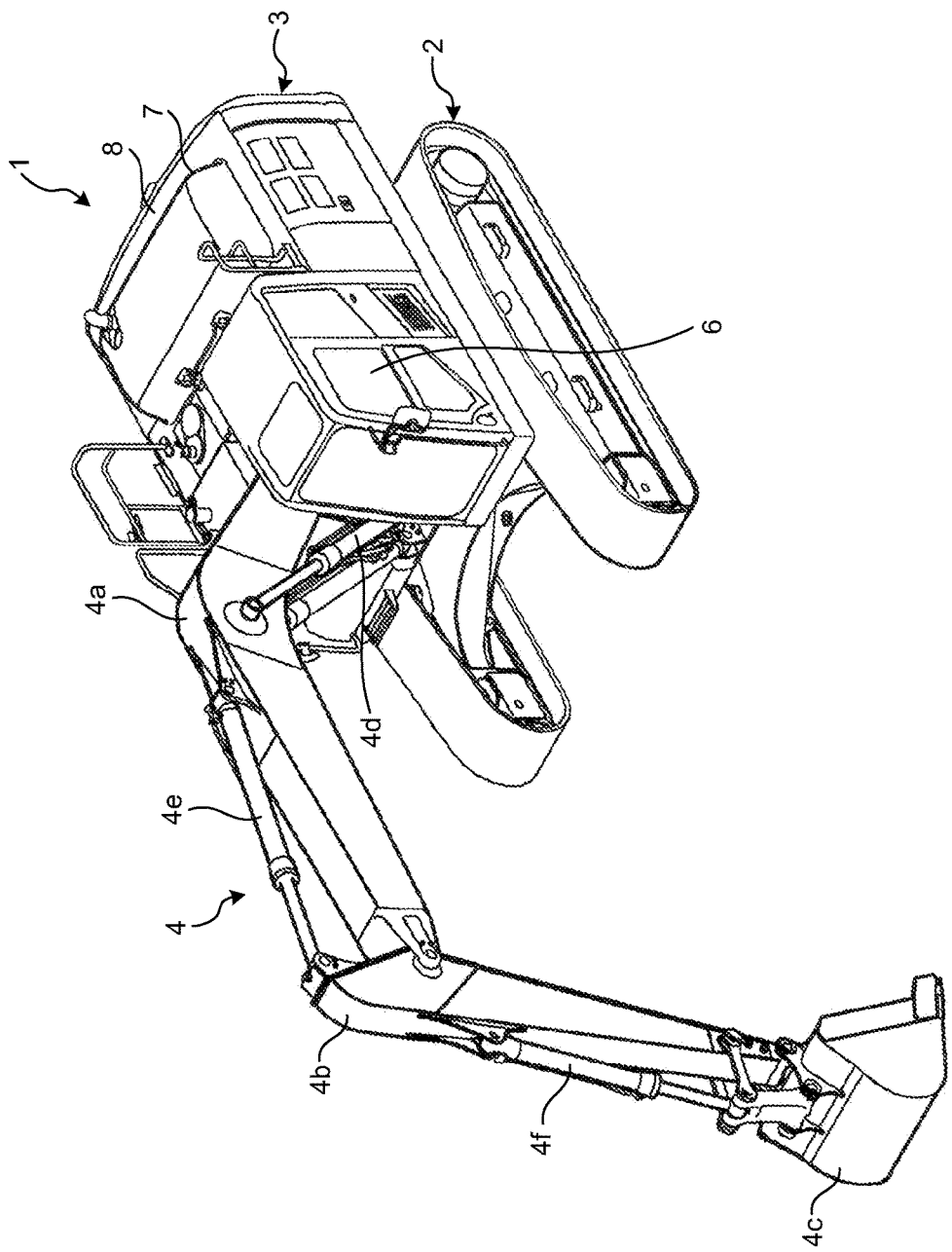
FIG. 1 is a perspective view illustrating the entire configuration of an excavator equipped with a working machine periphery monitoring device as an embodiment of the present invention.

FIG. 1 is a perspective view illustrating the entire configuration of an excavator equipped with a working machine periphery monitoring device as an embodiment of the present invention. An excavator 1 is illustrated as an example of a working machine. The excavator 1 is provided with a self-propelled undercarriage 2, an upper swing body 3 which is swingably placed on the undercarriage 2, and a working device 4 which is disposed on the center of the front part of the upper swing body 3 and operates bendably and derrickably.

The working device 4 includes a boom 4a, an arm 4b, a bucket 4c, a boom cylinder 4d, an arm cylinder 4e, and a bucket cylinder 4f.

A cab 6 is placed on the front left part of the upper swing body 3. A power container 7 is mounted on the rear part of the upper swing body 3. An engine, a hydraulic pump, a radiator, and an oil cooler are housed inside the power container 7. A counterweight 8 is attached to the rear end of the upper swing body 3.

[Cab]

Figure 2:
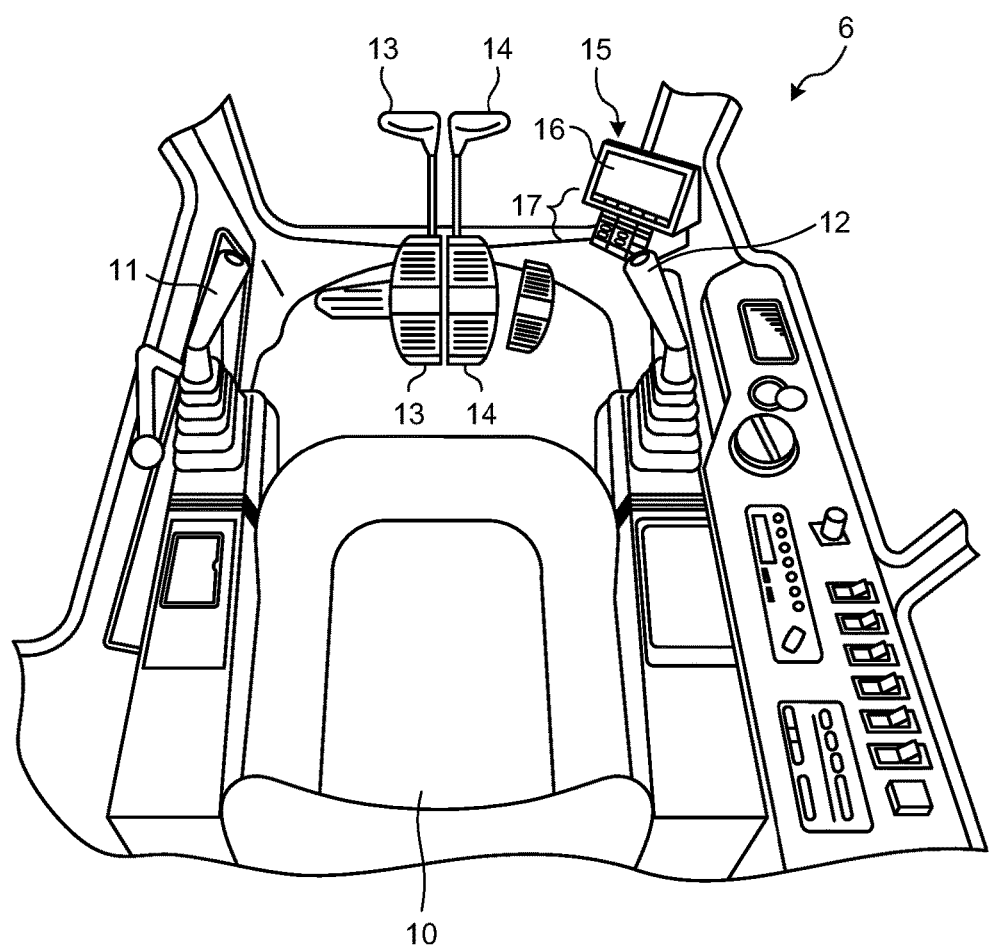
FIG. 2 is a diagram illustrating an internal arrangement of a cab.

FIG. 2 is a diagram illustrating an internal arrangement of the cab 6. As illustrated in FIG. 2, operation levers 11 and 12 are arranged, for example, on left and right sides of an operator seat 10 inside the cab 6. The operation lever 11 corresponds to the swing operation of the upper swing body 3 and the operation of the arm 4b. The operation lever 12 corresponds to the operation of the boom 4a and the operation of the bucket 4c. A combination of the operation of the operation lever 11 or 12 and the operation of any of the working devices is not limited to the combination in the present embodiment.

A traveling lever 13 and a traveling lever 14 are capable of allowing left and right crawlers of the undercarriage 2 to move forward and backward in accordance with an operation.

A monitor 15 is arranged on the front right side of the cab 6. The monitor 15 includes a display unit 16 and an operation unit 17. The display unit 16 is a display device such as a liquid crystal display and capable of displaying various kinds of information of the working machine, for example, machine information such as engine water temperature, oil temperature, and remaining fuel amount, warning information indicating abnormality of the devices, a menu screen, and a maintenance screen.

The monitor 15 is capable of displaying an image captured by a camera (described below) (a single camera image) and an image generated by transforming a plurality of camera images into upper viewpoint images and synthesizing the transformed images (bird's eye image).

The operation unit 17 includes a function switch having a plurality of functions corresponding to display contents of the display unit 16 and a switch for performing various settings such as an operation mode, a traveling mode, and an air conditioner. The monitor 15 may include a touch panel obtained by integrating the display unit 16 with the operation unit 17. The operation unit 17 may be separated from the display unit 16 and provided in another place inside the cab.

[Configuration of Cameras]

Figure 3:
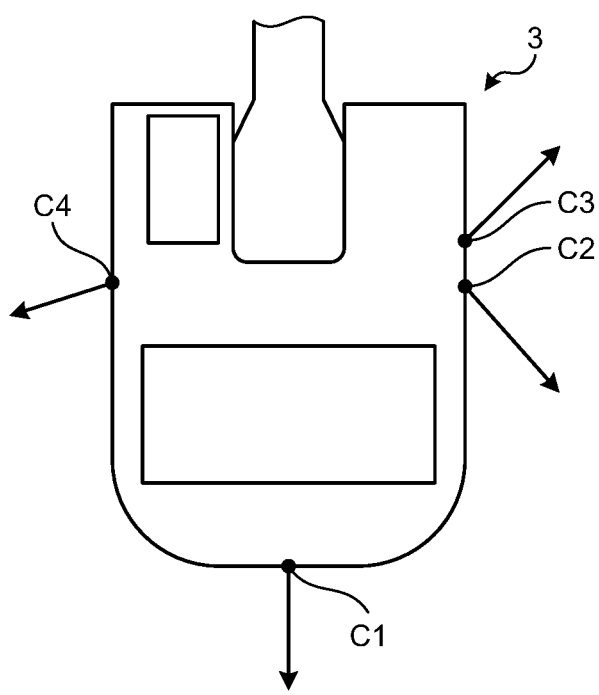
FIG. 3 is a plan view illustrating the arrangement of cameras.

Cameras C1 to C4 are attached to the upper swing body 3. As illustrated in FIG. 3, the camera C1 is attached to the rear side of the upper swing body 3 and images the rear side of the upper swing body 3. The camera C2 is attached to the right side of the upper swing body 3 and images the rear right side of the upper swing body 3. The camera C3 is attached to the right side of the upper swing body 3 and images the front right side of the upper swing body 3. The camera C4 is attached to the left side of the upper swing body 3 and images the left side of the upper swing body 3. For example, each of the cameras C1 to C4 has a visual field range of a predetermined angle in a right-left direction and a height direction. A charge-coupled device (CCD) camera may be used as each of the cameras. Each of the cameras C1 to C4 may have a wide dynamic range function.

[Entire Configuration of Control System]

Figure 4:
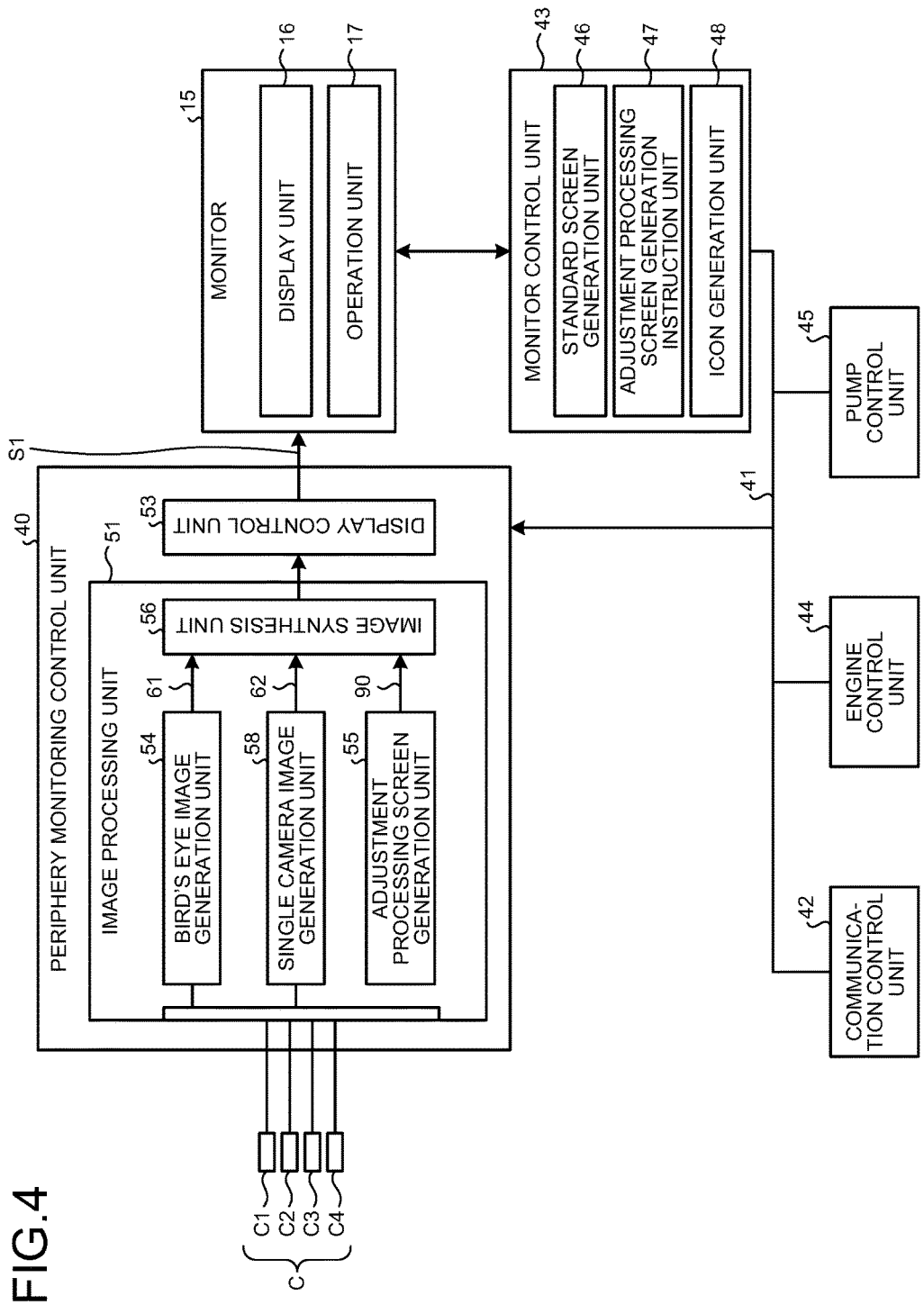
FIG. 4 is a block diagram illustrating a detailed configuration of the entire control system and a periphery monitoring control unit of the excavator.

FIG. 4 is a block diagram illustrating the configuration of the entire control system of the excavator 1. As illustrated in FIG. 4, a periphery monitoring control unit 40 (a second monitor control unit), a communication control unit 42, a monitor control unit 43 (a first monitor control unit), an engine control unit 44, and a pump control unit 45 are connected to a CAN 41 which is one of in-vehicle networks.

The monitor control unit 43 (the first monitor control unit) is connected to the monitor 15 and functions as a display control unit of the monitor 15. The monitor control unit 43 performs input/output control for various kinds of information of the working machine such as information transmitted from various sensors through the CAN 41 and information input through the switch disposed on the monitor 15. Accordingly, it is possible to perform control for displaying machine information such as the engine water temperature, the oil temperature, and the fuel remaining amount, warning information indicating abnormality of the devices, a menu screen, and a maintenance screen on the monitor 15.

Figure 6:
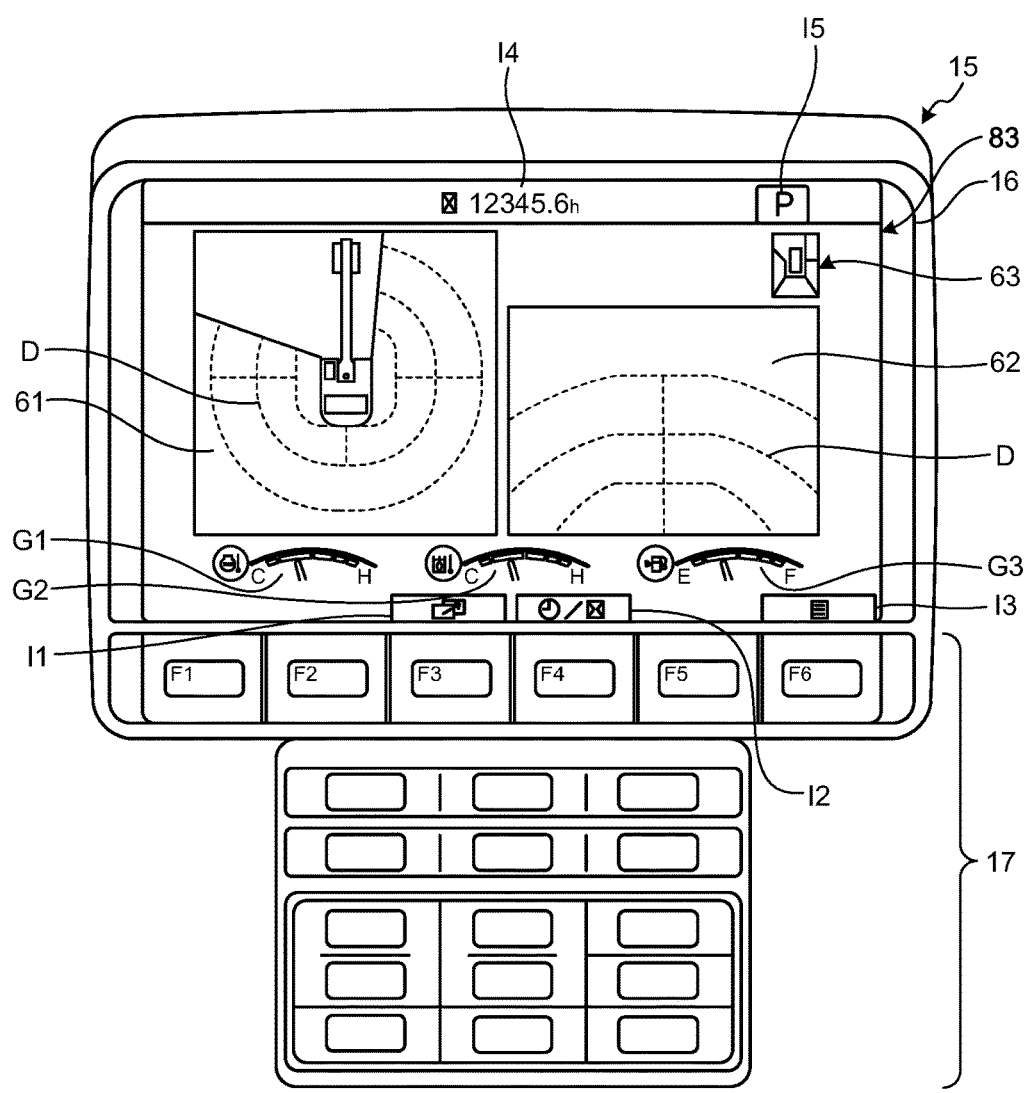
FIG. 6 is a diagram illustrating a state in which a standard screen is displayed on a display unit of a monitor.

The monitor control unit 43 includes a standard screen generation unit 46, an adjustment processing screen generation instruction unit 47, and an icon generation unit 48. The standard screen generation unit 46 generates a standard screen to be displayed on the display unit 16 of the monitor 15. As an example, a screen displayed on the display unit 16 of the monitor 15 in FIG. 6 is a standard screen 83. As illustrated, various kinds of information such as an engine water temperature gauge G1 and a fuel level gauge G3 and special information such as a bird's eye image 61 and a single camera image 62 are displayed on one screen.

Figure 8:
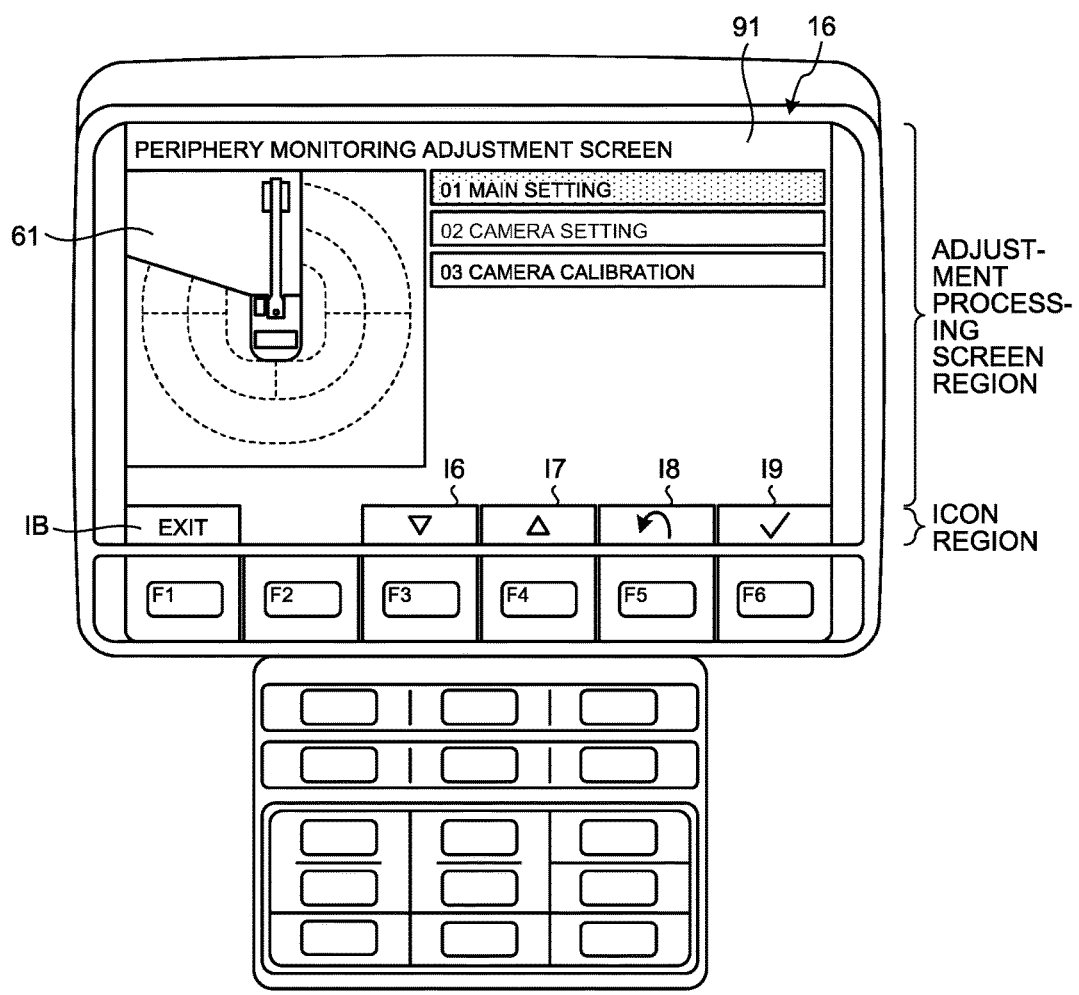
FIG. 8 is a diagram illustrating an example of a main setting selection screen as the adjustment processing screen.

When the adjustment processing screen generation instruction unit 47 receives an adjustment processing screen generation instruction from the operation unit 17 of the monitor 15 by an operation of an operator, the adjustment processing screen generation instruction unit 47 outputs the adjustment processing screen generation instruction to the periphery monitoring control unit 40 through the CAN 41. Then, an adjustment processing screen generation unit 55 in the periphery monitoring control unit 40 receives the generation instruction and generates an adjustment processing screen. The adjustment processing screen is a dedicated screen for previously inputting the installation positions and directions of the plurality of cameras to the periphery monitoring control unit 40 for generating a correct bird's eye image and for performing various kinds of calibration for displaying a correct bird's eye image. As an example, a screen illustrated in FIG. 8 is the adjustment processing screen. An adjustment processing item illustrated on the right side and a bird's eye image illustrated on the left side are displayed on one screen.

When the adjustment processing screen is displayed on the display unit 16, the icon generation unit 48 in the monitor control unit 43 generates an icon outside a region of the adjustment processing screen generated by the periphery monitoring control unit 40, specifically, a region on the lower part of the screen, for example. Examples of the icon generated by the icon generation unit 48 include icons IB, and I6 to I9 illustrated on the lower part of the screen (icon region) in FIG. 8.

Selection/determination of various menus can be performed on the adjustment processing screen by depressing function switches F3 to F6 which respectively correspond to the icons I6 to I9 displayed on the lower part of the screen in FIG. 8. At this time, when the operation unit 17 which includes the function switches is operated, a signal thereof is output to the adjustment processing screen generation unit 55 in the periphery monitoring control unit 40 through the monitor control unit 43 and the CAN 41. Then, the adjustment processing screen generation unit 55 generates a new adjustment processing screen corresponding to the received signal and outputs the generated adjustment processing screen to the monitor as a video signal S1.

On the other hand, when the function switch F1 which corresponds to the icon IB with "EXIT" (described below) is depressed, the operation unit 17 which includes the function switch outputs a signal to the monitor control unit 43. The monitor control unit 43 generates a standard screen corresponding to the signal received by the standard screen generation unit 46 inside thereof and outputs the generated standard screen to the monitor 15. Accordingly, even when the periphery monitoring control unit 40 cannot receive a signal from the operation unit 17 due to a malfunction in the periphery monitoring control unit 40, it is possible to cause a prompt return to a screen generated by the monitor control unit 43, for example, the standard screen.

The periphery monitoring control unit 40 (the second monitor control unit) is connected to a camera group C which includes the cameras C1 to C4 and the monitor 15. As described below, the periphery monitoring control unit 40 outputs an image obtained by synthesizing a single camera image captured by any of the cameras with a bird's eye image.

The periphery monitoring control unit 40 includes an image processing unit 51 and a display control unit 53. The image processing unit 51 includes a bird's eye image generation unit 54, a single camera image generation unit 58, the adjustment processing screen generation unit 55, and an image synthesis unit 56.

Figure 5:
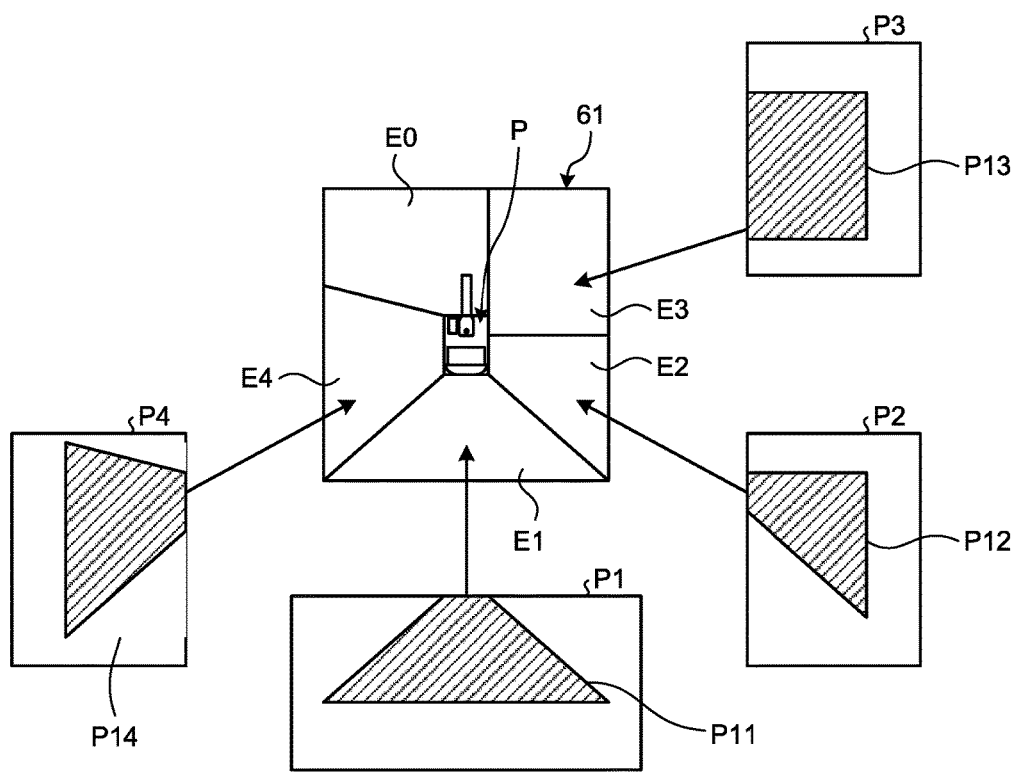
FIG. 5 is an explanatory diagram describing bird's eye image generation processing performed by a bird's eye image generation unit.

The bird's eye image generation unit 54 generates the bird's eye image 61 on the basis of images obtained from the respective cameras C1 to C4. As illustrated in FIG. 5, the bird's eye image generation unit 54 transforms images P1 to P4 respectively obtained from the cameras C1 to C4 into upper viewpoint images. That is, the bird's eye image generation unit 54 transforms the images into images viewed from a predetermined virtual viewpoint located above the excavator 1.

Specifically, the bird's eye image generation unit 54 performs image transformation in which the images are projected on a predetermined virtual projection plane corresponding to the ground surface level from the virtual viewpoint above the excavator 1. Then, the bird's eye image generation unit 54 cuts out transformed images P11 to P14 which respectively correspond to regions E1 to E4 of a frame which displays the bird's eye image and synthesizes the transformed images P11 to P14 within the frame. An image P of the excavator 1 viewed from the upper side is previously pasted to the bird's eye image generated by the bird's eye image generation unit 54 in order to cause the positional relationship with the excavator 1 clear.

Information of the bird's eye image 61 is input to the image synthesis unit 56. Since a region E0 can be visually recognized from the cab 6, no bird's eye image is generated therein. Although the four cameras C1 to C4 are used in the present embodiment, the number of cameras may be any number. For example, three cameras C1, C2, and C4 may be used. In this case, the camera C2 images the right side similarly to the camera C4.

The single camera image generation unit 58 outputs a single camera image 62 captured by any of the cameras C1 to C4 to the image synthesis unit 56 in response to a request from the standard screen generation unit 46 of the monitor control unit 43. Specifically, when an operation for switching a single camera image 62 is performed by an operator through the operation unit 17, a signal thereof is transferred to the single camera image generation unit 58 through the monitor control unit 43 and the CAN 41. Accordingly, the single camera image generation unit 58 outputs a single camera image 62 of the corresponding camera to the image synthesis unit 56 in accordance with the instruction.

The adjustment processing screen generation unit 55 generates an adjustment processing screen 90 in accordance with a generation instruction from the adjustment processing screen generation instruction unit 47 and outputs the generated adjustment processing screen 90 to the image synthesis unit 56.

When there is a request from the standard screen generation unit 46 of the monitor control unit 43, the image synthesis unit 56 synthesizes a bird's eye image 61 output from the bird's eye image generation unit 54 and a single camera image 62 output from the single camera image generation unit 58 as with the bird's eye image 61 and the single camera image 62 displayed on the standard screen 83 in FIG. 6. The synthesized image is output as a video signal S1 to the display unit 16 through the display control unit 53.

When there is a request from the adjustment processing screen generation instruction unit 47 of the monitor control unit 43, the image synthesis unit 56 generates a screen obtained by synthesizing the bird's eye image 61 with a periphery monitoring adjustment screen 01 (91) which is one screen of the adjustment processing screen 90 as with the screen in FIG. 8. The synthesized image is output as a video signal S1 to the display unit 16 through the display control unit 53. In the present invention, the bird's eye image 61, the single camera image 62, and the adjustment processing screen 90 generated in the periphery monitoring control unit 40 are defined as special information.

[Standard Screen of Monitor]

FIG. 6 is a diagram illustrating a state in which an example of the standard screen 83 is displayed on the display unit 16 of the monitor 15. The standard screen 83 is an initial screen which is displayed when a predetermined time has passed after a key switch is turned on. A typical standard screen displays various kinds of information of the working machine, for example, machine information such as the engine water temperature, the oil temperature, and the fuel remaining amount, warning information indicating abnormality of the devices, a menu screen, and a maintenance screen.

In the example of the standard screen 83 in FIG. 6, in addition to the above various kinds of information of the working machine, the bird's eye image 61 is displayed on the left center of the display unit 16 and the single camera image 62 is displayed on the right center of the display unit 16 as the special information. The single camera image 62 in FIG. 6 is obtained by imaging the rear side by the camera C1 which is disposed on the rear side of the upper swing body 3. Reference lines D which indicate the distance and the direction from a swing center are displayed on the bird's eye image 61 and the single camera image 62.

A single camera image position icon 70 is displayed on the upper right of the single camera image 62. The single camera image position icon 70 represents which one of the cameras has captured the single camera image 62 displayed on the display unit 16. In FIG. 6, the single camera image position icon 70 represents that the single camera image 62 has been captured by the camera C1. Although, in FIG. 6, the bird's eye image 61 is displayed on the left side and the single camera image 62 is displayed on the right side, the displayed positions of the images may be reversed.

The engine water temperature gauge G1 which indicates the water temperature of a cooling water of an engine, an operating oil temperature gauge G2 which indicates the oil temperature of an operating oil inside an oil hydraulic circuit, and the fuel level gauge G3 which indicates a level of the remaining amount of fuel are displayed on the lower part of the display unit 16. The operating oil temperature gauge G2 may not be displayed.

The function switches F1 to F6 are switches for inputting signals corresponding to icons displayed by the display unit 16 right above the respective switches. In FIG. 6, an icon I1 which switches the single camera image 62 to full screen display is displayed above the function switch F3. An icon I2 which performs switching of a camera of the single camera image 62 (for example, switching from an image of the camera C1 to an image of the camera C2) is displayed above the function switch F4. An icon I3 which performs switching to a menu screen is displayed above the function switch F6. The menu screen is used to check various settings and conditions of the working machine.

The icons I1 to I3 corresponding to the function switches may not be displayed, and switches corresponding thereto may be provided in another operation unit. An icon I4 displays a value of a service meter. An icon I5 displays a setting state of an operation mode.

[Screen Transition Between Standard Screen and Adjustment Processing Screen]

Figure 7:
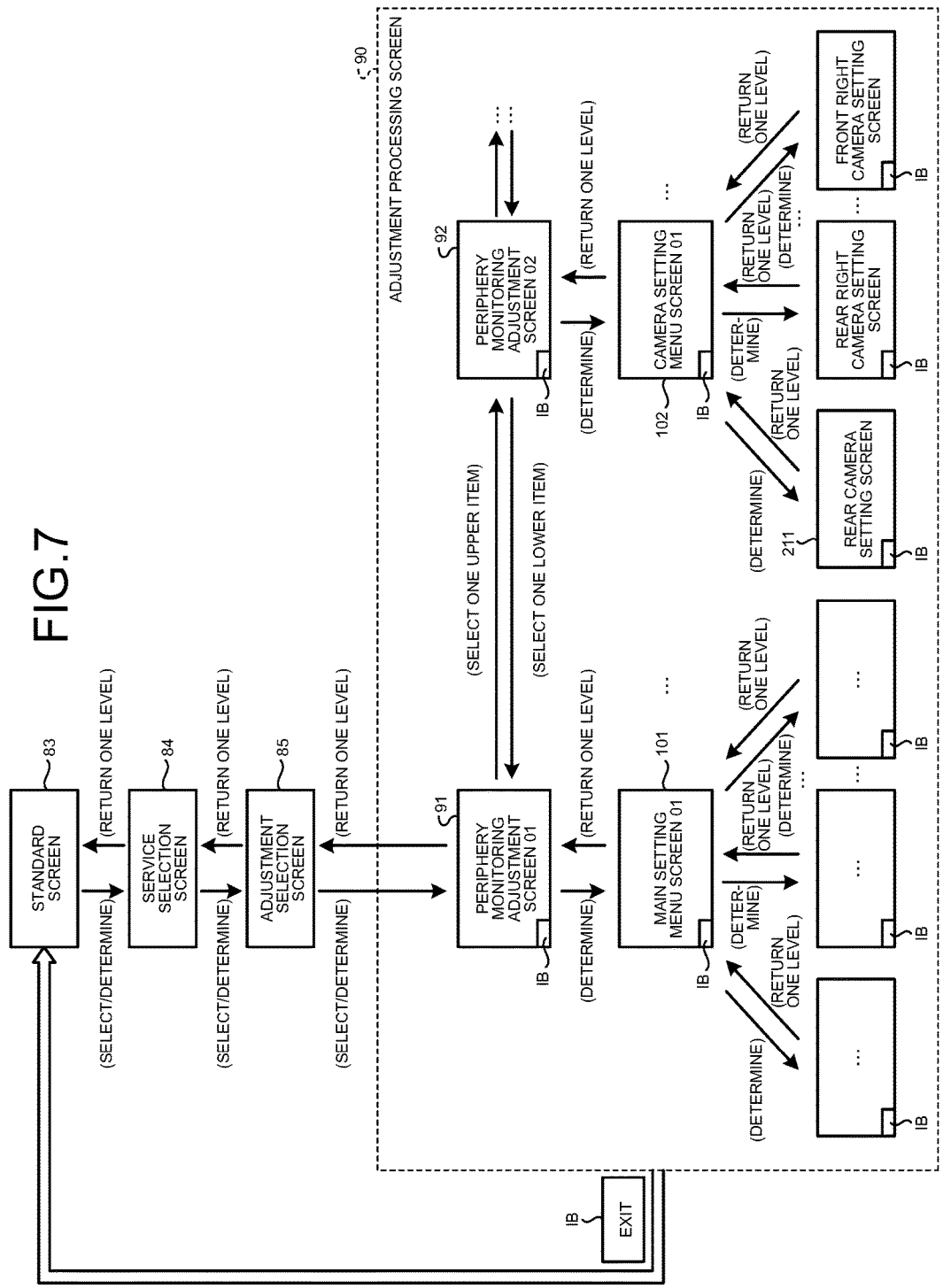
FIG. 7 is a diagram describing screen transition between the standard screen and an adjustment processing screen.

FIG. 7 is a diagram describing screen transition between the standard screen 83 and the adjustment processing screen 90. As an initial screen, the standard screen 83 illustrated in FIG. 6 is displayed. In order to cause a transition from the standard screen 83 to the adjustment processing screen 90 for performing calibration of the periphery monitoring control unit 40, the function switch F6 is depressed on the standard screen 83 to cause a transition to the menu screen described above.

A plurality of various setting items are arranged on the menu screen. A "SERVICE SELECTION" menu is selected and determined from the various setting items to cause a transition to a service selection screen 84 (not illustrated). Similarly, a plurality of items are arranged on the service selection screen 84. An "ADJUSTMENT SELECTION" menu (not illustrated) is selected and determined from the items to cause a transition to an adjustment selection screen 85. Similarly, a "MAIN SETTING SELECTION" menu is selected and determined on the adjustment selection screen 85 to cause a transition to a main setting selection screen 91.

As a result, the periphery monitoring adjustment screen 01 (91) as the adjustment processing screen 90 for performing adjustment processing of a bird's eye image is displayed. The adjustment processing screen 90 has a hierarchical structure. A transition to one lower level is made every time when any item is "determined". Depressing a "RETURN ONE LEVEL" button causes a transition to one higher level.

The standard screen 83, the service selection screen 84, and the adjustment selection screen 85 illustrated in FIG. 7 are generated by the standard screen generation unit 46 in the monitor control unit 43. The adjustment processing screen 90 including the periphery monitoring adjustment screen 01 (91) and a camera setting menu screen 102 is generated by the adjustment processing screen generation unit 55 in the periphery monitoring control unit 40 in accordance with an instruction from the adjustment processing screen generation instruction unit 47 in the monitor control unit 43.

Thus, for example, when a transition from the standard screen 83 to the service selection screen 84 is made, signal input/output is performed in the following manner. When a "SERVICE SELECTION" item is "selected and determined" in the operation unit 17 included in the monitor 15, a signal thereof is output to the monitor control unit 43. Accordingly, the standard screen generation unit 46 in the monitor control unit 43 generates the service selection screen 84 and outputs the generated service selection screen 84 to the display unit 16 so as to be displayed.

On the other hand, when a transition from the periphery monitoring adjustment screen 01 (91) to a periphery monitoring adjustment screen 02 (92) is made, signal input/output is performed in the following manner. When a "SELECT ONE LOWER ITEM" switch is depressed in the operation unit 17 included in the monitor 15, a signal thereof is output to the periphery monitoring control unit 40 through the monitor control unit 43. Accordingly, the adjustment processing screen generation unit 55 in the periphery monitoring control unit generates the periphery monitoring adjustment screen 02 (92) and outputs the generated periphery monitoring adjustment screen 02 (92) as the video signal S1 to the display unit 16 so as to be displayed.

FIG. 8 illustrates the periphery monitoring adjustment screen 01 (91). The bird's eye image 61 is displayed on the left side of the screen and selection items are displayed on the right side thereof. In this state, "01 MAIN SETTING" which is a colored item located on the top is selected. In FIG. 8, a region on the upper and middle part of the screen is an adjustment processing screen region generated by the periphery monitoring control unit 40, and a region on the lower part of the screen in which the icons are arranged is an icon region generated by the icon generation unit 48 in the monitor control unit 43.

The icon I4 which corresponds to the function switch F3 indicates "SELECT ONE LOWER ITEM". The icon I5 which corresponds to the function switch F4 indicates "SELECT ONE UPPER ITEM". The icon I6 which corresponds to the function switch F5 indicates "RETURN ONE LEVEL". The icon I7 which corresponds to the function switch F6 indicates "DETERMINE". An "EXIT" icon located on the lower left part of the screen in FIG. 8 is an EXIT icon IB (return switch).

As also illustrated in FIG. 7, the EXIT icon IB is displayed on each adjustment processing screen 90 including the periphery monitoring adjustment screen 01 (91). When the function switch F1 (return switch) which corresponds to the EXIT icon IB is depressed, any screen transitions to the standard screen 83 which is generated by the monitor control unit 43.

In this case, signal input/output is performed in the following manner. A signal is output from the operation unit 17 which has the function switch F1 to the monitor control unit 43. The monitor control unit 43 receives the signal, generates the standard screen 83 by the standard screen generation unit 46, and outputs the generated standard screen 83 to the display unit 16.

Depressing the function switch F3 (SELECT ONE LOWER ITEM) in a state in which the periphery monitoring adjustment screen 01 (91) is displayed as illustrated in FIG. 8 causes a transition to the periphery monitoring adjustment screen 02 (92) in which "02 CAMERA SETTING" which is one lower item is selected (not illustrated).

Figure 9:
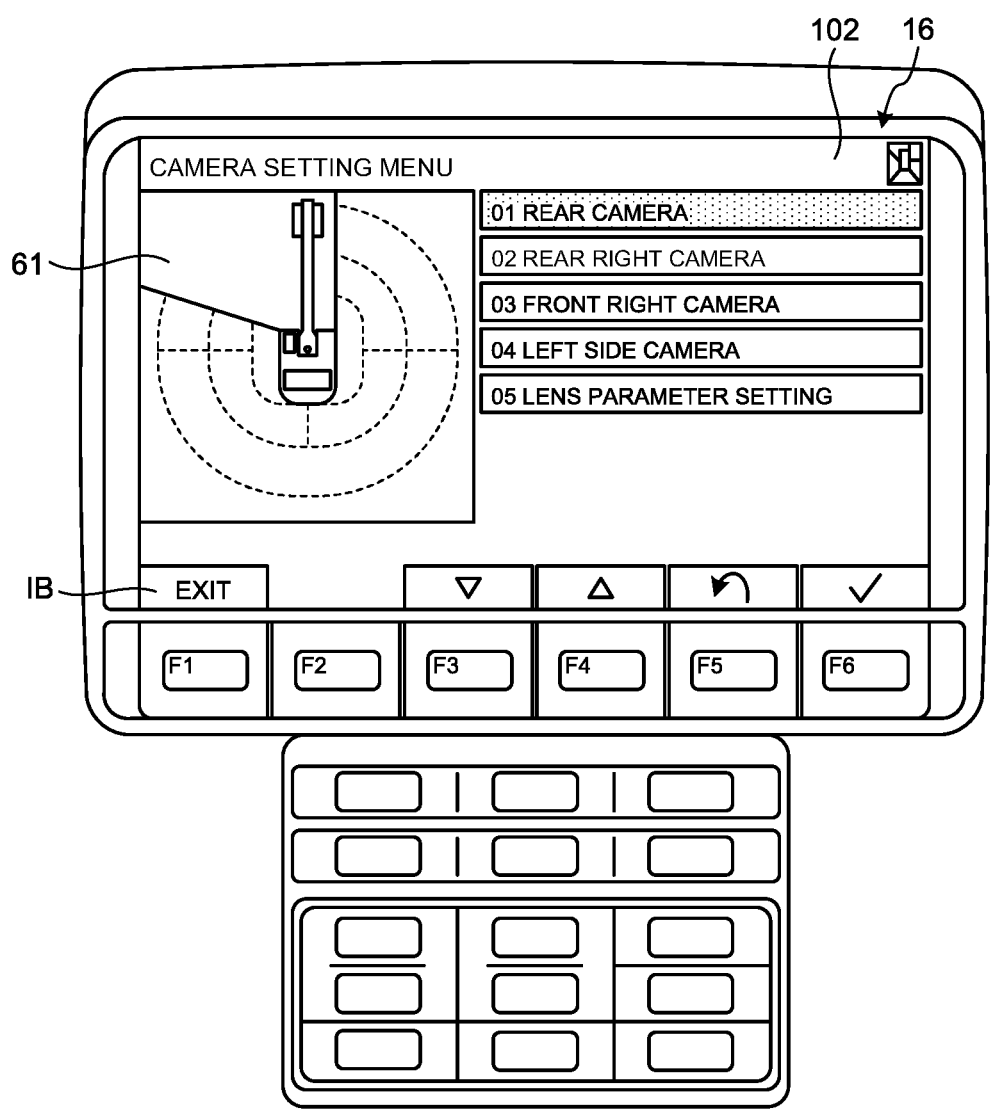
FIG. 9 is a diagram illustrating an example of a camera setting menu screen as the adjustment processing screen.

Further, depressing the function switch F6 (DETERMINE) with "02 CAMERA SETTING" selected (the periphery monitoring adjustment screen 02 (92)) causes a transition to the camera setting menu screen 102 illustrated in FIG. 9.

When the periphery monitoring control unit 40 is in normal operation and, for example, the "RETURN ONE LEVEL" switch (the function switch F5) is depressed with the camera setting menu screen 102 displayed, a signal thereof is transmitted to the periphery monitoring control unit 40. The periphery monitoring control unit 40 generates the periphery monitoring adjustment screen 02 (92) and outputs the generated periphery monitoring adjustment screen 02 (92) to the display unit 16.

On the other hand, when the periphery monitoring control unit 40 does not receive a signal due to the occurrence of any malfunction, the periphery monitoring control unit 40 cannot receive a signal of "RETURN ONE LEVEL" from the operation unit 17. Accordingly, the camera setting menu screen 102 does not transition to the periphery monitoring adjustment screen 02 (92), but remains displayed. In this case, even when the "DETERMINE" switch (the function switch F6) or the "SELECT ONE LOWER ITEM" switch (the function switch f3) is depressed in the same manner as above, it is not possible to cause a screen transition.

However, even in such a case, depressing the return switch for outputting a signal for causing a transition to a screen generated by the monitor control unit 43 enables a signal indicating that the switch has been operated to be transmitted to the monitor control unit 43 without through the periphery monitoring control unit 40 which does not receive the signal. Accordingly, it is possible to generate the standard screen 83 in the monitor control unit 43 and display the generated standard screen 83 on the display unit 16, that is, to cause an immediate return to the standard screen 83.

Thus, even when any malfunction occurs in the periphery monitoring control unit during the calibration of the bird's eye image and adjustment processing cannot be performed, it is possible to cause a prompt transition to a screen generated by the monitor control unit 43, for example, the standard screen. Accordingly, an operator can reliably check basic information such as the engine water temperature and the fuel remaining amount.

Although, in the above embodiment, depressing the return switch enables a transition to the standard screen, the present invention is not limited to this embodiment. For example, a touch panel display may be used, and an EXIT icon displayed on the screen may be merely tapped. Alternatively, a return switch may be provided as a dedicated switch in the operation unit 17. Alternatively, a separate return switch may be provided in a place other than the monitor.

Although, in the above embodiment, depressing the return switch causes a transition to the standard screen 83, a transition to any screen generated by the monitor control unit 43 may be made.

In the above embodiment, there has been described an example in which the periphery monitoring control unit which generates, for example, the single camera image, the bird's eye image, and the adjustment processing screen is used. However, any control unit, other than the above control unit, that outputs an image for displaying special information of the working machine that is generated by the external control unit itself, for example, by performing sophisticated information processing (for example, information about an obstacle around the working machine, landform information of the entire working site, landform information around the working machine for supporting and guiding the operation of the working machine, or image information around the working machine used for remote control) and displays the special information on the monitor may be used. The single camera image, the bird's eye image, and the adjustment processing screen are also included in the special information of the working machine.

Although, in the above embodiment, the periphery monitoring control unit 40 and the monitor control unit 43 are connected to each other through the CAN 41, the present invention is not limited to this form. For example, the periphery monitoring control unit 40 and the monitor control unit 43 may be disposed on the same substrate or the same chip.

Although, in the above embodiment, the bird's eye image 61 and the single camera image 62 are simultaneously displayed on the standard screen, the present invention is not limited to this configuration. Only the bird's eye image or only the single camera image may be displayed, or none of the images may be displayed on the standard screen. Although, in the above embodiment, the bird's eye image 61 is displayed on the adjustment processing screen, no bird's eye image may be displayed on the adjustment processing screen.

In the above embodiment, the excavator has been described. Alternatively, the present invention may be applied to any working machines such as a dump truck, a bulldozer, and a wheel loader.

In the above embodiment, a configuration in which the monitor 15 is provided in the cab 6 of the working machine has been described. Alternatively, a display unit may be provided in another place, for example, a remote control room for performing remote control of the working machine or a control room in which a plurality of working machines in a construction site are totally managed and controlled. The monitor 15 may be configured as a portable terminal (for example, the monitor 15 may be detachable) so that an operator can see a bird's eye image displayed on a display unit in the portable terminal.

When a display unit is provided in a remote control room or a control room, a return switch is also preferably provided in the remote control room or the control room. When a monitor is configured as a portable terminal, a return switch may be provided in the portable terminal or may be provided in a device separated from the portable terminal.

When a bird's eye image is displayed on the display unit in the remote control room or the control room or when the display unit is provided in the portable terminal, any communication means may be provided in the working machine and the operation room, the control room, or the portable terminal to perform transmission/reception of information such as the bird's eye image.

REFERENCE SIGNS LIST

1 excavator
2 undercarriage
3 upper swing body
4 working device
4a boom
4b arm
4c bucket
4d boom cylinder
4e arm cylinder
4f bucket cylinder
6 cab
7 power container
8 counterweight
10 operator seat
11, 12 operation lever
13, 14 traveling lever
15 monitor 16 display unit
17 operation unit
40 periphery monitoring control unit (second monitor control unit)
42 communication control unit
43 monitor control unit (first monitor control unit)
44 engine control unit
45 pump control unit
46 standard screen generation unit
47 adjustment processing screen generation instruction unit
48 icon generation unit
51 image processing unit
53 display control unit
54 bird's eye image generation unit
55 adjustment processing screen generation unit
56 image synthesis unit
58 single camera image generation unit
61 bird's eye image
62 single camera image
70 single camera image position icon
83 standard screen
84 service selection screen
85 adjustment selection screen
90 adjustment processing screen
91 periphery monitoring adjustment screen 01
92 periphery monitoring adjustment screen 02
102 camera setting menu screen
211 rear camera setting screen
C camera group
C1 to C4 camera
D reference line
F1 to F6 function switch
G1 engine water temperature gauge
G2 operating oil temperature gauge
G3 fuel level gauge
I1 to I9, IB icon
S1 video signal

The invention claimed is:

1. A working machine display system comprising:
a monitor including a display unit;
a first monitor control unit connected to the monitor and configured to generate a screen for displaying various kinds of information of a working machine and output the screen as a signal to the monitor;
a second monitor control unit, which is different from the first monitor control unit, connected to the monitor and configured to generate a screen for displaying special information of the working machine and output the screen as a signal to the monitor, the second monitor control unit comprising an image processing controller;
an operation unit; and
a return switch configured to output a signal to the first monitor control unit when the return switch is operated,
wherein the monitor is configured to display the various kinds of information of the working machine on the display unit in accordance with a signal output from the first monitor control unit and display the special information of the working machine on the display unit in accordance with a signal output from the second monitor control unit,
the operation unit is configured to switch a display screen between displaying the various kinds of information of the working machine and displaying the special information of the working machine on the display unit, and
even when abnormal processing occurs in the second monitor control unit so that the second monitor control unit cannot receive a signal from the operation unit of the monitor while the monitor displays the special information of the working machine, the monitor changes displaying from the special information of the working machine to the various kinds of information of the working machine when the return switch is operated,
wherein the abnormal processing is a malfunction of the image processing controller.

2. The working machine display system according to claim 1, further comprising a plurality of cameras configured to acquire conditions around the working machine,
wherein the second monitor control unit is a periphery monitoring control unit connected to the cameras and configured to generate a single camera image of each of the cameras, a bird's eye image generated based on images captured by the cameras, and an adjustment processing screen for performing adjustment processing for the bird's eye image,
the special information of the working machine includes the adjustment processing screen,
the periphery monitoring control unit is configured to generate the adjustment processing screen and output the adjustment processing screen as a signal to the monitor, and
the return switch is a switch configured to cause a transition from a state in which the display unit of the monitor displays the adjustment processing screen to the display screen of the various kinds of information of the working machine.

3. The working machine display system according to claim 2, wherein the adjustment processing screen includes the bird's eye image and/or the single camera image.

4. The working machine display system according to claim 1, wherein the return switch is displayed on the monitor or disposed on the monitor.

5. The working machine display system according to claim 1, wherein the return switch is separated from the monitor.

6. The working machine display system according to claim 1, wherein the various kinds of information of the working machine includes machine information, warning information, a menu screen and/or a maintenance screen.

7. The working machine display system according to claim 1, wherein the special information of the working machine includes a single camera image, a bird's eye image, an adjustment processing screen, information about an obstacle around the working machine, landform information of the entire working site, landform information around the working machine for supporting and guiding operation of the working machine and/or image information around the working machine used for remote control.

8. The working machine display system according to claim 1, wherein the first and second monitor control units are separate control units, each of which is individually connected to the monitor and to an in-vehicle network.

9. A display method in a working machine comprising:
providing a monitor including a display unit;
providing a first monitor control unit connected to the monitor and configured to generate a screen for displaying various kinds of information of a working machine and output the screen as a signal to the monitor;
providing a second monitor control unit, which is different from the first monitor control unit, connected to the monitor and configured to generate a screen for displaying special information of the working machine and output the screen as a signal to the monitor, the second monitor control unit comprising an image processing controller;

providing an operation unit which is configured to switch a display screen between displaying the various kinds of information of the working machine and displaying the special information of the working machine on the display unit;

providing a return switch configured to output a signal to the first monitor control unit when the return switch is operated;

displaying various kinds of information of the working machine on the display unit by outputting a signal from the first monitor control unit to the monitor;

displaying special information of the working machine in place of the various kinds of information on the display unit by outputting a signal from the second monitor control unit to the monitor; and even when abnormal processing occurs in the second monitor control unit so that the second monitor control unit cannot receive a signal from the operation unit of the monitor while the monitor displays the special information of the working machine, changing on the monitor from displaying the special information of the working machine to displaying the various kinds of information of the working machine when the return switch is operated, wherein the abnormal processing is a malfunction of the image processing controller.

* * * * *